(12) United States Patent
Voigt et al.

(10) Patent No.: US 10,336,226 B2
(45) Date of Patent: Jul. 2, 2019

(54) TOOL FOR FASTENING A LISTING BEAD TO A FASTENER STRIP

(71) Applicant: Velcro BVBA, Beinze (BE)

(72) Inventors: Paul Joseph Voigt, Waterdown (CA); Victor Horst Kheil, Kitchener (CA); Michael Cina, Toronto (CA)

(73) Assignee: Velcro BVBA (BE)

( * ) Notice: Subject to any disclaimer, the term of this patent is extended or adjusted under 35 U.S.C. 154(b) by 224 days.

(21) Appl. No.: 15/440,230

(22) Filed: Feb. 23, 2017

(65) Prior Publication Data
US 2018/0236914 A1 Aug. 23, 2018

(51) Int. Cl.
| | |
|---|---|
| *B60N 2/58* | (2006.01) |
| *B60N 2/60* | (2006.01) |
| *B60N 2/70* | (2006.01) |
| *A47C 31/02* | (2006.01) |
| *B25B 27/00* | (2006.01) |
| *B65D 33/25* | (2006.01) |

(52) U.S. Cl.
CPC .......... *B60N 2/5825* (2013.01); *A47C 31/023* (2013.01); *B25B 27/0092* (2013.01); *B60N 2/6027* (2013.01); *B65D 33/2591* (2013.01); *B60N 2/5816* (2013.01); *B60N 2/7041* (2013.01)

(58) Field of Classification Search
CPC ...... A47C 7/24; A47C 31/023; B60N 2/5816; B60N 2/5825; B60N 2/5891; B60N 2/6027; B60N 2/7041; B23P 19/047; B25B 27/0092; Y10T 29/48; Y10T 29/481; Y10T 49/486; F16B 2/00; B65D 33/2591
See application file for complete search history.

(56) References Cited

U.S. PATENT DOCUMENTS 4,528,736 A * 7/1985 Hope .................. B25B 27/0092
29/235
5,187,843 A 2/1993 Lynch
(Continued)

FOREIGN PATENT DOCUMENTS

DE 10034088 1/2002
DE 102007006098 A1 * 8/2008 ............ B23P 19/047
(Continued)

OTHER PUBLICATIONS

International Search Report and Written Opinion in International Application No. PCT/EP2018/052025, dated May 3, 2018, 12 pages.
(Continued)

*Primary Examiner* — Matthew P Travers
(74) *Attorney, Agent, or Firm* — Fish & Richardson P.C.

(57) ABSTRACT

A listing bead fastening tool has a body that defines a guiding recess shaped to receive a listing bead, and a guide rib extending from the body. The guide rib has a neck and a head that is connected to the body of the tool by the neck. The head has a width to allow it to pass through a retention channel defined by opposing rows of fastener elements extending from a base of a fastener strip to which the listing bead is to be fastened. The guiding recess of the body of the tool defines a listing bead insertion path that is angled with respect to the retention channel. Moving the tool along the retention channel causes the listing bead, which is retained within the guiding recess, to be progressively inserted into the retention channel and retained between the rows of fastener elements.

12 Claims, 8 Drawing Sheets

(56) References Cited

U.S. PATENT DOCUMENTS

| | | | |
|---|---|---|---|
| 5,236,243 A | 8/1993 | Reyes | |
| 5,273,511 A | 12/1993 | Boeckman | |
| 5,293,672 A | 3/1994 | Tominaga et al. | |
| 5,403,094 A | 4/1995 | Tomic | |
| 5,633,048 A * | 5/1997 | Bodin | B25B 27/0092 |
| | | | 427/444 |
| 5,839,831 A | 11/1998 | Mazzocchi | |
| 5,878,468 A | 3/1999 | Tomic et al. | |
| 5,900,303 A | 5/1999 | Billarant | |
| 5,934,806 A | 8/1999 | Tomic et al. | |
| 6,138,329 A | 10/2000 | Johnson | |
| 6,152,600 A | 11/2000 | Tomic | |
| 6,167,597 B1 | 1/2001 | Malin | |
| 6,692,147 B2 | 2/2004 | Nelson | |
| 6,877,898 B2 | 4/2005 | Berich et al. | |
| 7,077,473 B2 | 7/2006 | Demain et al. | |
| 7,108,904 B2 | 9/2006 | Itoh et al. | |
| 7,216,405 B2 | 5/2007 | Gradl | |
| 7,270,479 B2 | 9/2007 | Nelson | |
| 8,522,406 B2 | 9/2013 | Voigt | |
| 8,857,018 B2 * | 10/2014 | Murasaki | A47C 31/023 |
| | | | 24/297 |
| 9,526,302 B2 * | 12/2016 | Saiga | B60N 2/5825 |
| 2002/0101109 A1 | 8/2002 | Stiller et al. | |
| 2008/0120815 A1 | 5/2008 | Line | |
| 2009/0096274 A1 | 4/2009 | Pedde et al. | |
| 2011/0232057 A1 * | 9/2011 | Muxlow | B23P 19/047 |
| | | | 29/243.58 |
| 2015/0089773 A1 * | 4/2015 | Kheil | B29C 43/28 |
| | | | 24/114.5 |

FOREIGN PATENT DOCUMENTS

| | | | | |
|---|---|---|---|---|
| DE | 102007053009 A1 * | 10/2008 | | B60N 2/5825 |
| WO | 03/033359 | 4/2003 | | |

OTHER PUBLICATIONS

International Preliminary Report on Patentability for International Application No. PCT/IB2010/002856 dated Dec. 9, 2011, 6 pages.

\* cited by examiner

TOOL FOR FASTENING A LISTING BEAD TO A FASTENER STRIP

TECHNICAL FIELD

This disclosure relates to the fastening of a listing bead to a fastener strip for a releasable fastening, and more particularly to a tool to facilitate such fastening to attach a fabric panel to a supporting foam structure.

BACKGROUND

Furniture, automotive seat coverings and other upholstery applications have long employed hog rings, stitching or fasteners to secure the edges or seams of the upholstery or other fabric panels to an underlying structure, e.g., a seat or furniture frame.

Seats for cars and light trucks have been formed by molding a foam bun that serves as the seat cushion. A pre-stitched fabric cover is then attached to the foam bun. Often, the fabric cover is attached to the foam bun by insert molding a plurality of touch fastener strips into the outer surface of the foam bun and attaching cooperating touch fastener products to an inner surface of the fabric cover. The mating portion of the separable fastener is attached to the seat cover to provide releasable attachment to the foam seat bun.

In some assemblies, a magnetically attractive material is attached to the fastener to temporarily hold the fastener in a trough or channel of the mold cavity wall, which is equipped with magnets. It is also possible to incorporate magnetically attractive material into the body of the fastener itself, such as in a plastic material that is used to make the fastener.

The touch fastener strips on the foam bun are typically recessed in trenches, to allow the seams in the fabric cover to be indented below the surface of the seat cushion. Indenting the seams in this manner forms aesthetically appealing indented creases in the surface of the seat cushion upholstery for a tailored look. The trenches also accommodate the additional thickness of upholstery fabric that is created where the seam is stitched.

The molded resin article is covered along its contour with a seat cover (i.e., upholstery material) by the engaging function between the engaging elements on the inner surface of the seat cover and the engaging elements of the fastener strip.

Generally, the fastener products are attached to the fabric cover along the seams where the cover is stitched together and held in place by the seam stitching. The touch fastener products allow the seat manufacturer to rapidly and semi-permanently attach the fabric cover to the foam bun by pulling the fabric cover over the foam bun and pressing the seam of the fabric cover down in to the foam bun trench to engage the cooperating touch fastener products on the foam bun and fabric. Some examples of the use of fastener strips to secure fabric panels to automotive seat foam buns are disclosed in U.S. Pat. Nos. 7,077,473 and 7,108,904.

Other installations employ point attachment or clip systems, e.g., hog rings with attachment or anchor points approximately 100 mm apart. Such installations can be prone to creep, resulting in puckering or trim wrinkles near the attachment points. Such systems can also require a high force to engage the bead into the clip. Accordingly, improvements are sought in the efficacy and efficiency of attachment or anchoring of upholstery, fabrics, and other panels or materials.

SUMMARY

Implementations of the present invention are generally directed to a tool for fastening a listing bead to a fastener strip. Various aspects of the invention feature a listing bead fastening tool that includes a body that defines a guiding recess shaped to receive a listing bead, and a guide rib extending from the body. The guide rib has a neck and a head connected to the body by the neck. The head has a width to allow the head to pass through a retention channel defined by opposing rows of fastener elements extending from a base of a fastener strip. The guiding recess defines a listing bead insertion path that is angled with respect to the retention channel such that moving the tool along the retention channel causes the listing bead, which is retained within the guiding recess, to be progressively inserted into the retention channel and retained between the rows of fastener elements.

In some implementations, the tool includes a graspable handle that extends from the body of the tool. In some cases, the handle is detachable from the body of the tool. In some cases, the handle is flexibly attached to the body of the tool to allow the handle to flexibly move in at least one transverse direction relative to the body (e.g., transverse to a longitudinal axis of the strip) as the tool is being moved.

In some implementations, the guiding recess is disposed completely above the neck.

In some implementations, the head of the guide rib extends beyond an exit of the guiding recess. In some implementations, the head has a length that spans between 3 and 12 of the fastener elements.

In some implementations, the guiding recess is bounded, on a side opposite the head, by a lip disposed to engage an upper surface of the listing bead.

In some implementations, the body defines a slot extending along the guiding recess and accommodating a trim cover web connected to the listing bead.

In some implementations, the body includes a securing portion that extends from the body to contact an attachment surface of the listing bead as the listing bead is guided into the retention channel. The attachment surface may attach the bead to the trim cover. In some cases, a lip of the securing portion contacts the upper surface of the listing bead on one side of the listing bead. In some cases, the securing portion contacts the upper surface of the listing bead on both sides of the listing bead. For example, the securing portion may include two lips that contact the upper surface of the listing bead on either side of the listing bead, with a gap between the lips to allow passage of the trim cover.

Various aspects of the invention feature a method that includes: grasping a tool having a body and a guide rib extending from the body and having a neck and a head connected to the body by the neck, the body defining a guiding recess shaped to receive the listing bead; inserting the head of the guide rib into a retention channel defined between opposing rows of fastener elements extending from a base of the fastener strip, with the guiding recess defining a listing bead insertion path angled with respect to the retention channel; and moving the tool along the retention channel, thereby causing the listing bead retained within the guiding recess to be progressively inserted into the retention channel and retained between the rows of fastener elements.

In some implementations, the method further includes, prior to moving the tool along the retention channel, inserting the listing bead into the guiding recess.

In some implementations, inserting the head includes inserting the head into an end of the retention channel. In some cases, a leading portion of the head is tapered to facilitate inserting the head into the end of the retention channel.

In some implementations, inserting the head includes pressing on the tool to insert the head between the opposing rows of fastener elements. In some cases, a bottom portion of the head is configured as a wedge, along a length of the head, that facilitates inserting the head into the retention channel.

In some implementations, the head is configured to displace the fastener elements and widen the retention channel as the listing bead is guided into the retention channel. In some cases, the head is further configured to allow the fastener elements to relax and at least partly enclose the listing bead and retain the listing bead in the strip as the tool moves along the fastener strip.

In some implementations, the tool is initially attached to a holding feature at an end of the listing bead, and the method further includes detaching the tool from the holding feature prior to moving the tool along the retention channel. In some cases, the holding feature, after being detached from the tool, holds the end of the listing bead against a corresponding end of the fastener strip while the listing bead is progressively inserted into the retention channel.

In some implementations, at least some of the fastener elements include, at a distal end of the respective fasteners, a head portion that extends over the base of the fastener strip, and the top of the head of the guide rib contacts the bottom of the respective head portions of at least some of the fastener elements while the head is in the retention channel. In some cases, the fastener elements of only one of the opposing rows of fastener elements includes the head portions that extend over the base of the fastener strip.

It is appreciated that various embodiments of the invention can include any combination of the aspects and features described herein. That is, examples are not limited to the combinations of aspects and features specifically described herein, but also include any combination of those aspects and features.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Except as otherwise described, similar reference numbers in the drawings indicate similar elements.

DETAILED DESCRIPTION

Figure 1:
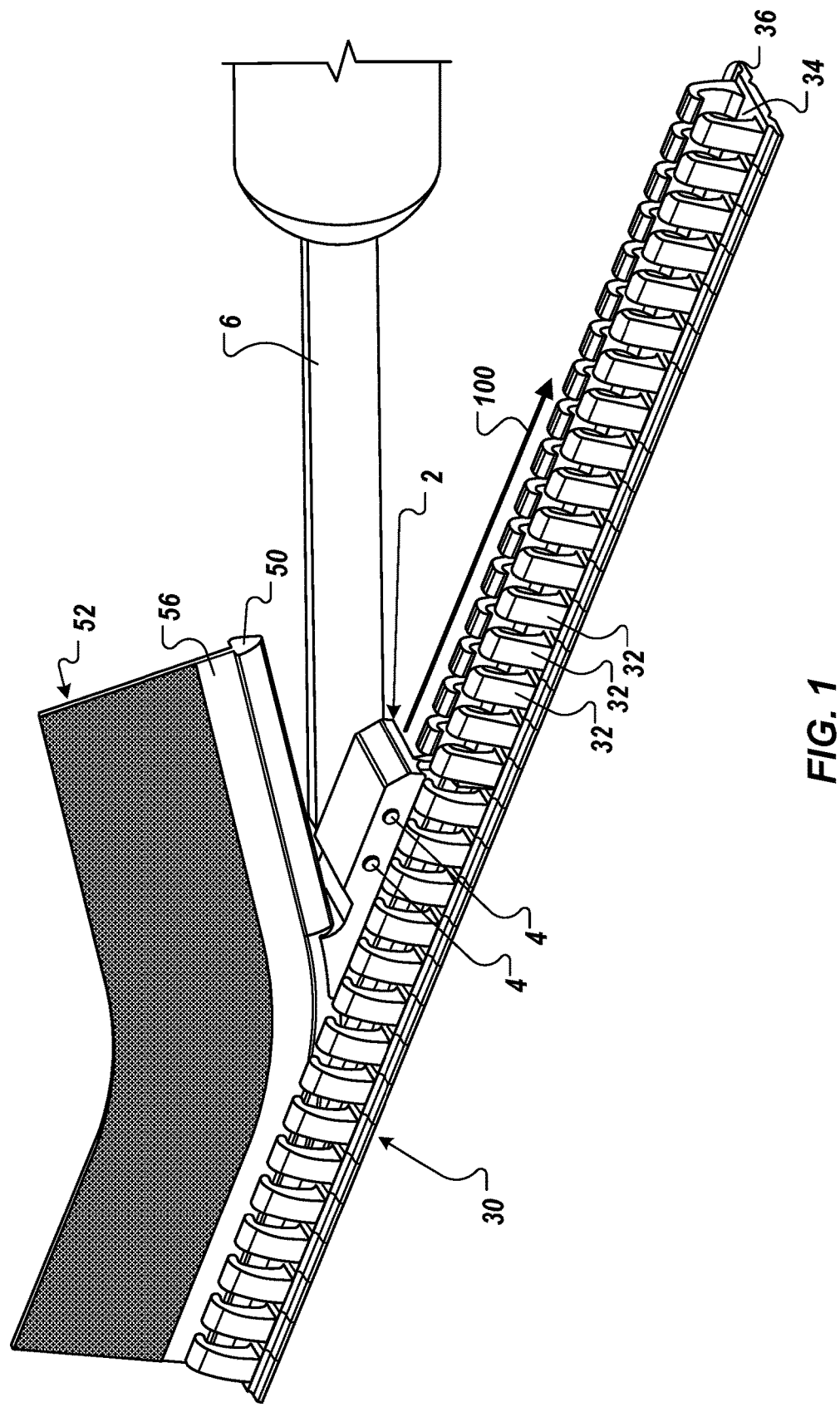
FIG. 1 is a perspective view of a tool guiding a listing bead into a fastener strip.

Implementations of the present disclosure are directed to a tool configured to guide a listing bead into the retention channel of a fastener strip, to fasten the listing bead to the fastener strip. In some examples, the fastener strip is molded into, or otherwise attached to, a foam bun of a seat cushion, such as in an automotive seat. The listing bead may be sewn into, or otherwise attached to, a seat cover, which may also be described as a seat trim cover, trim cover, trim cover web, or cover. In such examples, the tool described herein is useable to fasten the listing bead to the fastener strip and thus fit the seat cover to the seat.

In some examples, the fastener strip has a narrow width and/or small height, so as to provide an unobtrusive and subtle attachment mechanism for securing the cover on the seat. Such small dimensions may also provide an aesthetically pleasing fit and finish of the trim cover on the seat. For example, the height and/or width of the fastener strip may be 3-10 mm. Such small dimensions may make it awkward for an installer, using their fingers alone, to fasten the cover to the seat by achieving a consistent engagement of the listing bead into the fastener strip. The tool described herein provides a mechanism for fastening a listing bead to a fastener strip in instances where the bead and strip may be so small that installation using fingers alone may be awkward or even impossible. The tool is configured to enable the installer to easily thread the listing bead of the trim cover onto the tool and then use the tool to easily find and engage into the (e.g., small) features of the fastener strip. Once engaged, the tool is pulled along the longitudinal axis of the fastener strip to guide the listing bead into the retention channel of the fastener strip, until the complete length of the listing bead is fastened to the fastener strip. Use of the tool also allows the fastener strip to be assembled as a curved shape, e.g., as a "U" shape, and also allows the fastener strip to be assembled as a single piece instead of being assembled as multiple (e.g., three) separate lengths for attachment. In some implementations, the fastener strip is a single, continuous clip that is manufactured through extrusion or other suitable techniques.

The tool may be manufactured using any suitable technique, including but not limited to extrusion molding, injection molding, or 3-D printing. The tool may be composed of any suitable material or combination of materials. In some implementations, the tool is injection molded with a small dimension to minimize cost of manufacture, and the tool may include a small handle to help the installer guide the tool. The gripped portion of the handle may be approximately the dimensions of the pads of a finger and/or thumb, suitable for gripping between the installer's finger and thumb. The handle may be a ring, tab, T-attachment, or other suitable configuration. In some instances, the handle is a graspable portion of the tool that extends out from the body of the tool. In some implementations, the tool is pre-installed on the listing bead ready for fastening the bead into the fastener strip. After fastening is complete, the tool may be disposed or returned to the manufacturer for re-use. In some implementations, the tool is made in a bright color to make it easy to find for installing a trim cover onto a seat, and to ensure that the tool is readily noticeable so that it is not inadvertently left in the seat or otherwise lost.

FIG. 1 is a perspective view of a tool 2 guiding a listing bead 50 into a fastener strip 30. The fastener strip 30 may also be described as a strip or a clip, and the listing bead may also be described as a bead. The bead 50 may be attached to a trim cover 52, to facilitate the installation of the trim cover 52 onto a seat as described above. In some implementations, the bead 50 is configured to engage with the fastener strip 30 as described below. An attachment portion 56 is attached to and extends from bead 50 to attach bead 50 to cover 52. In some examples, the attachment portion 56 is molded or co-extruded into the fabric of the cover 52. The attachment portion 56 may be a thin film that provides a low friction surface for a portion of tool 2 (e.g., the securing portion described below) to slide along as the tool 2 is moved to fasten the bead 50 to the fastener strip 30.

Fastener strip 30 includes a base 34 and a plurality of fastener elements 32 that extend from the base 34. The fastener elements 32 may be arranged into (e.g., parallel) opposing rows of elements, on opposite sides of the fastener strip 30, to define a retention channel 36 along the longitudinal axis of the fastener strip 30. As shown in the example of FIG. 1, the fastener elements 32 may be spaced and discrete in that the fastener elements 32 along each side of the fastener strip 30 are separated from one another by a gap. Alternatively, the fastener elements may be contiguous, without a space separating the elements on each side of the strip 30. In some cases, the elements 32 are arranged such that an element 32 on one side of the strip 30 is directly across from another element 32, as shown in FIG. 1. Alternatively, the elements 32 may be staggered in arrangement such that an element 32 on one side is not directly across from another element 32. In some implementations, the fastener elements 32 are each approximately 2 mm in width, with a 1 mm gap separating the elements 32 along a side of the strip 30. In some implementations, the elements 32 are arranged such that there are between 5 and 50 elements per inch on each side along the length of the strip 30. Each of the fastener elements 32 may include a stem that extends upward from the base 34, and a head portion (or head) at a distal end of the fastener element 32 (distal from the base). The head of the fastener element 32 may overhang the base 34 to at least partly define the top of the retention channel 36. In some implementations, there is a gap between the opposing heads of opposing elements 32, to allow passage of part of the tool 2, and to allow entry of the bead 50, as described below.

Fastener strip 30 and/or the listing bead 50 may be configured as described in U.S. Pat. No. 8,522,406, "Releasable Fastening Along a Bead," the entirety of which is hereby incorporated by reference into the present disclosure.

Tool 2 may be configured such that at least a first portion (e.g., the head) of tool 2 passes through retention channel 36 as tool 2 is moved in a direction 100 along the longitudinal axis of strip 30. The direction 100 may also be described as a longitudinal, or long, axis of strip 30, or the direction of movement. The configuration of tool 2 is described further with reference to FIGS. 2-8. In some implementations, tool 2 includes one or more attachment elements 4, also described as attachment point(s), at which a handle 6 is attached to the head of the tool 2. Handle 6 facilitates the moving of tool 2 by an installer to install trim cover 52 onto a seat that includes fastener strip 30. Although the example of FIG. 1 depicts two attachment elements 4 used for attaching handle 6, any suitable number of attachment elements 4 may be included in tool 2. In some implementations, a single attachment element 4 may be provided on tool 2.

Handle 6 is preferably flexible, and/or has a flexible attachment to tool 2, to allow handle 6 to move in one or more directions with respect to the tool 2. This flexibility may facilitate use of handle 6 to pull tool 2 along strip 30, and may make is easier for an installer to move tool 2 around curves of strip 30. Handle 6 may be arranged as a T-shape, a tab, a ring, or other configuration that is easy for an installer to grip with two fingers (e.g., finger and thumb). In a particular implementation, handle 6 is flexibly attached to the tool 2 at a single attachment point, to enable free movement of handle 6 as tool 2 is being moved. Alternatively, handle 6 may be rigid and/or have a rigid attachment to tool 2. Handle 6 may be of a piece with tool 2, e.g., molded as a single part, such that the handle 6 is a graspable component of the tool that extends from the tool. Alternatively, handle 6 may be a separate piece that is attached to tool 2 at attachment point(s) 4. The handle 6 may be permanently attached to the tool 2, or may be detachable from the tool 2.

As shown in the example of FIG. 1, handle 6 may be offset to one side relative to the center plane of strip 30, e.g., the plane formed by the longitudinal axis of strip 30 and an axis extending upward perpendicular to base 34 of strip 30. Such an arrangement may tend to pull tool 2 to one side as it is pulled along strip 30, giving bead 50 some clearance to prevent other elements from interfering with bead 50 as it is being guided into strip 30. The offset arrangement may also provide a small amount of force from tool 2 against bead 50, in a transverse direction that is perpendicular to the longitudinal axis of strip 30. Such force may help stabilize bead 50 against tool 2 as the bead is being guided into strip 30. In some implementations, the offset arrangement of the handle 6 relative to the center plane may prevent interference between the installer's hand and the trim cover while the cover is being installed through use of the tool. The offset arrangement may also facilitate the engaging of the listing bead into a curved portion of the clip. In some implementations, tool 2 is inline in the center plane of strip 30, to provide a more efficient application of force more directly along the longitudinal axis as tool 2 is pulled. In some implementations, the handle is attached at one or more attachment points that are on the front of the tool 2, to provide more efficient application of force in the direction of movement of the tool along the longitudinal axis of the clip. The handle 6 may be attached to the tool 2 with a flexible attachment such that the handle is able to move in one or more transverse directions relative to the tool 2. Such a flexible attachment may facilitate the pulling of the tool 2 around curves in the clip.

As shown in the example of FIG. 1, listing bead 50 has a cross section having a wedge shape with two sides that are substantially symmetric across the plane of trim cover 52. As bead 50 is situated into retention channel 36 using tool 2, the heads of the fastener elements 32 close over the top surface of bead 50 thus securing bead 50 into strip 30. In some implementations, bead 50 may be asymmetric, with a wedge on a single side of bead 50. In such implementations, fastener elements 32 may be configured such that elements 32 on one side of strip 30 have a head portion that overhangs retention channel 36 and elements 32 on the other side of strip 30 do not have an overhanging head portion. The heads of elements 32 on the wedged side of bead 50 may close over the top surface of bead 50 on one side of trim cover 52, and elements 32 on the other side may reference against the (e.g., substantially flat) attachment portion 56 on the other side of bead 50. Although the various figures depict the bead 50 as having a cross-section that is a wedge shape at the bottom, implementations are not limited to this shape. In some implementations, the bead 50 may have a cross-section that is square, circular, or some other suitable shape. In some implementations, the bead 50 may have a wedge shape that is more, or less, pointed than that shown in the figures. Moreover, in some implementations, the bead 50 may have a cross-section that is shaped similarly to the shape of the channel 36, to enable the bead 50 to be retained more securely within the channel 36.

Figure 2:
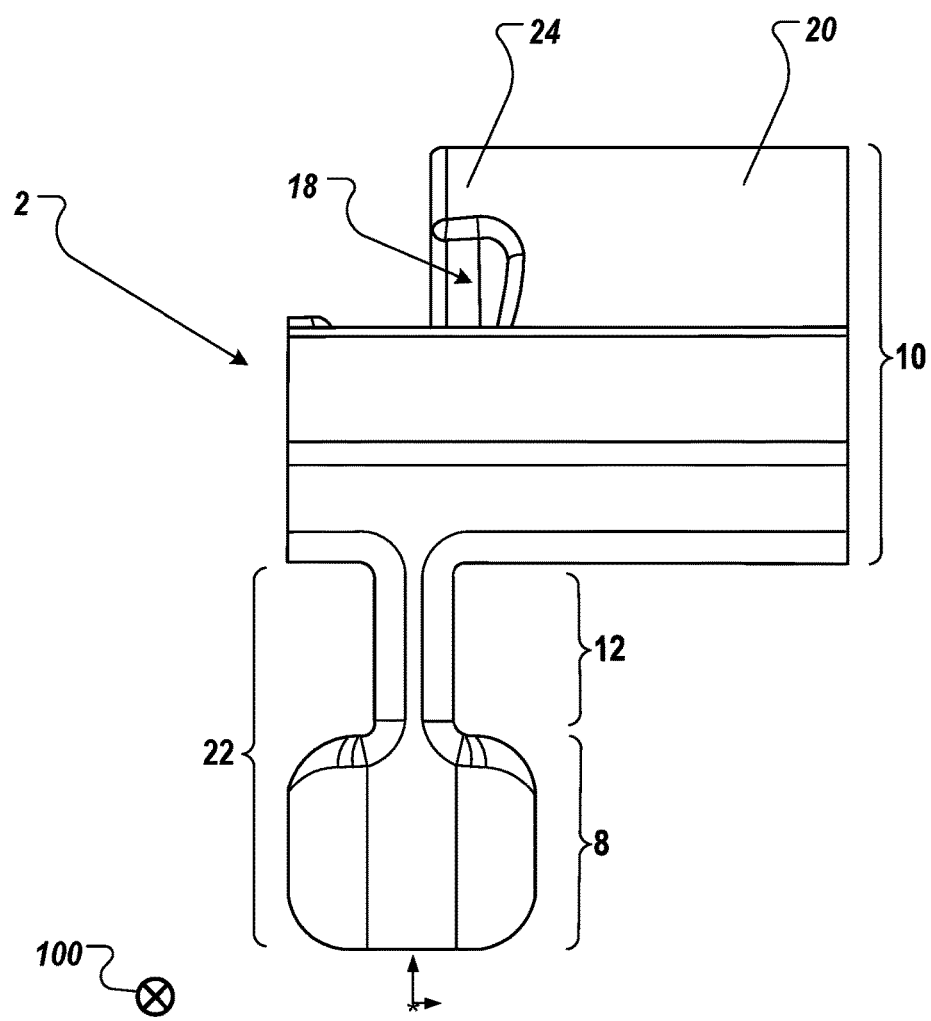
FIG. 2 is a front end view of the tool of FIG. 1.

FIG. 2 is a front end view of tool 2. In the view, the direction of movement 100 is directed out from the page. Tool 2 includes a body 10 and a guide rib 22 extending from body 10. Guide rib 22 has a neck 12 and a head 8 connected to the body 10 by the neck 12. Body 10 defines a guiding recess 18 that is shaped to receive the listing bead 50. Body 10 includes a securing portion 20 that extends in a direction away from guide rib 22 to define at least one side of guiding recess 18. Guiding recess 18 is bounded, on a side opposite the guide rib 22, by a lip 24 that is disposed to engage an upper surface of the bead 50.

Figure 3:
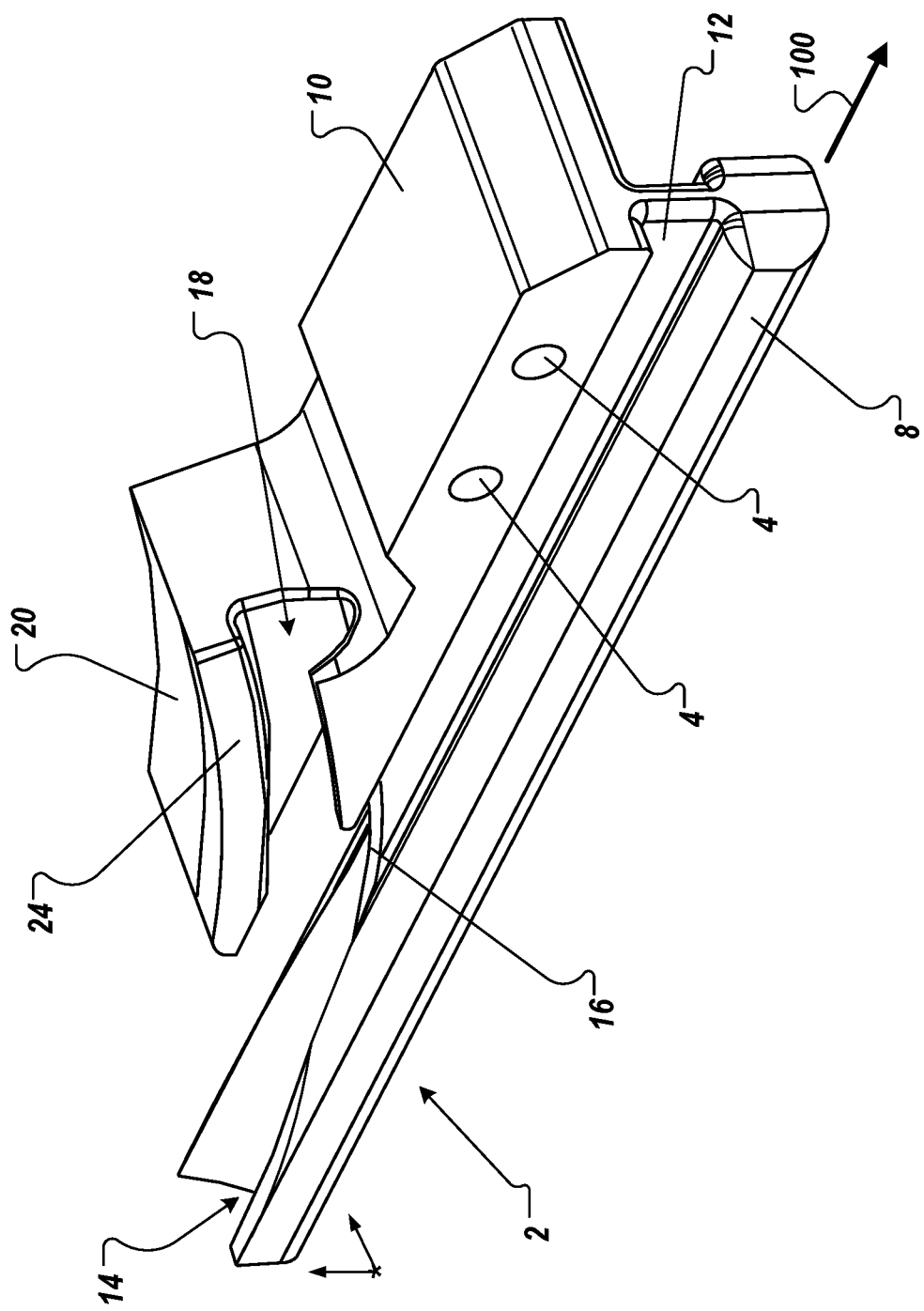
FIG. 3 is a first perspective view of the tool of FIG. 1.

FIG. 3 is a first perspective view of tool 2. As shown in FIG. 3, tool 2 includes a head 8 and a body 10, connected to one another by a neck 12. Head 8 has a width such that it is able to move through retention channel 36 defined by fastener elements 32 of fastener strip 30. In some implementations, the width of head 8 is approximately the width of the retention channel 36. In some implementations, the width of at least a (e.g., front or middle) portion of head 8 is slightly larger than the width of retention channel 36. This increased width slightly displaces fastener elements 32 from their resting position as tool 2 is moved. This displacement temporarily widens retention channel 36 to enable bead 50 to enter retention channel 36 with less interference from, and less friction against, fastener elements 32. In some implementations, the back portion of head 8 is approximately the width of retention channel 36 when fastener elements 32 are in their relaxed state (e.g., not displaced), to allow elements 32 to return to their relaxed state as tool 2 passes. Head 8 may have a width that varies slightly from the wider width of the front or middle portion to the width of the back portion. Accordingly, head 8 may be configured to have a variation in its width (e.g., taper) along its length from front to back.

In some implementations, neck 12 is attached to head 8 along a portion of the length of head 8, and neck 12 is also attached to body 10. Neck 12 may have a width that enables neck 12 to pass through the gap between the opposing heads of fastener elements 32 as tool 2 is moved along strip 30.

As described above, body 10 may form guiding recess 18 that is shaped to receive bead 50. Head 8 may be configured such that two sides of head 8, at the back portion of head 8, form a guiding recess continuation 14 that is also shaped to receive bead 50. An insertion path 16 may be defined by guiding recess 18 and guiding recess continuation 14, and may pass through guiding recess 18 and guiding recess continuation 14. Insertion path 16 may slope upward from the bottom of tool 2 toward body 10. Insertion path 16 may continue upward through guiding recess 18 that is formed in body 10. During operation of tool 2, the bottom of bead 50 contacts insertion path 16, and insertion path 16 guides bead 50 downward toward base 34 of strip 30 and into retention channel 36. Guiding recess 18 and guiding recess continuation 14 are each of a width to allow bead 50 to pass through guiding recess 18 and guiding recess continuation 14 as bead 50 is being guided into retention channel 36 of fastener strip 30.

In some implementations, body 10 includes securing portion 20 that stabilizes and/or secures bead 50 as it is being guided into retention channel 36. In the example of FIG. 3, securing portion 20 is one-sided such that it at least partly extends around one side of bead 50, with a side of securing portion 20 contacting the smooth surface of attachment portion 56 so that securing portion 20 does not fray or create friction against trim cover 52 as tool 2 is moved. A bottom surface of securing portion 20 may reference against, and slide along, the top surface of the bead 50 as tool 2 is moved.

In some implementations, securing portion 20 may extend upward on both sides of bead 50, such that the (two-sided) securing portion 20 partly encloses bead 50 from both sides, while providing a gap through which attachment portion 56 and trim cover 52 can pass as tool 2 is moved. This configuration may be employed in implementations where trim cover 52 and bead 50 are initially provided to the installer with tool 2 already threaded onto bead 50, as described above. The one-sided securing portion 20 described above may be employed in implementations where tool 2 is initially separated from trim cover 52 and bead 50, such that the open side of securing portion 20 can be used to thread tool 2 onto bead 50, i.e., to insert bead 50 into tool 2, prior to beginning the fastening of bead 50 into strip 30. In such cases, because securing portion 20 is open on one side, an installer can push tool 2 onto bead 50 from the open side, allowing lip 24 of securing portion 20 to engage the top surface of bead 50. In some implementations, the top of bead 50 may have an angle toward the center to enable bead 50 to catch against lip 24 of securing portion 20 and stabilize bead 50 within guiding recess 18. In implementations where securing portion 20 is one-side or two-sided, tool 2 may be initially threaded onto bead 50 from an end of bead 50. In some cases, the one-sided configuration of securing portion 20 may provide less friction, compared to the two-sided configuration, between tool 2 and bead 50 as tool 2 is moved along strip 30. Accordingly, use of the one-sided configuration may make it easier for the installer to move tool 2 and fasten trim cover 52 to strip 30.

Figure 4:
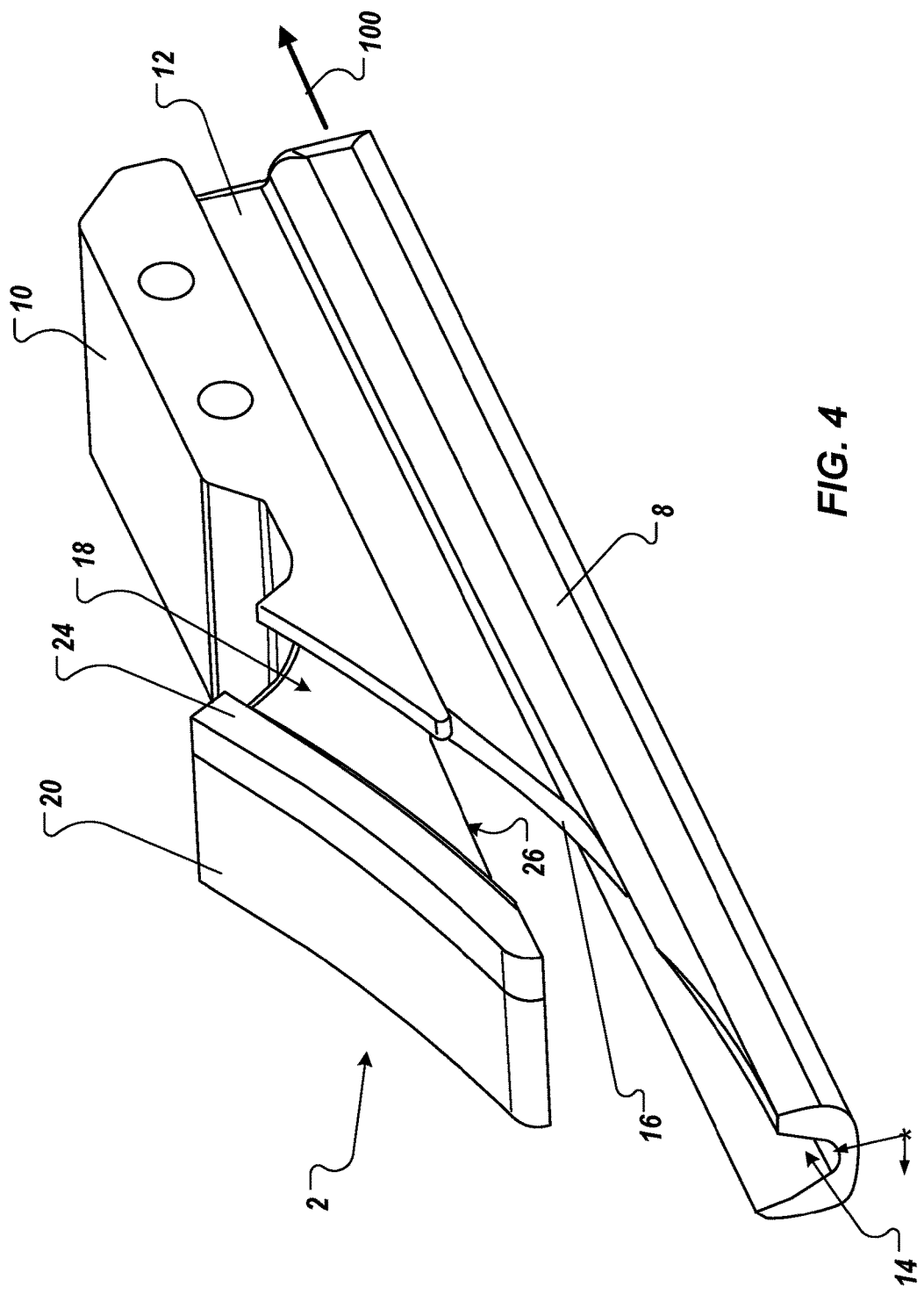
FIG. 4 is a second perspective view of the tool of FIG. 1.

FIG. 4 provides a different perspective view of tool 2 compared to that of FIG. 3. In some implementations, as shown in FIG. 4, insertion path 16 provides a substantially continuous slope upward from base 34 of the strip 30 through guiding recess continuation 14 of head 8, continuing its slope along a back side of neck 12 into guiding recess 18 of body 10. This continuous slope allows tool 2 to smoothly guide bead 50 downward into retention channel 36 as bead 50 is being fastened to strip 30.

In some implementations, the guiding recess 18 is disposed completely above neck 12, the guiding recess 18 having an exit 26 through the bottom of body 10. Head 8 may extend beyond exit 26 of guiding recess 18, as shown in FIG. 4. Guiding recess 18 may be bounded, on a side opposite head 8, by a lip 24 disposed to engage an upper surface of listing bead 50. Body 10 defines a slot extending along guiding recess 18 and accommodating trim cover web 52 connected to listing bead 50.

Figure 5:
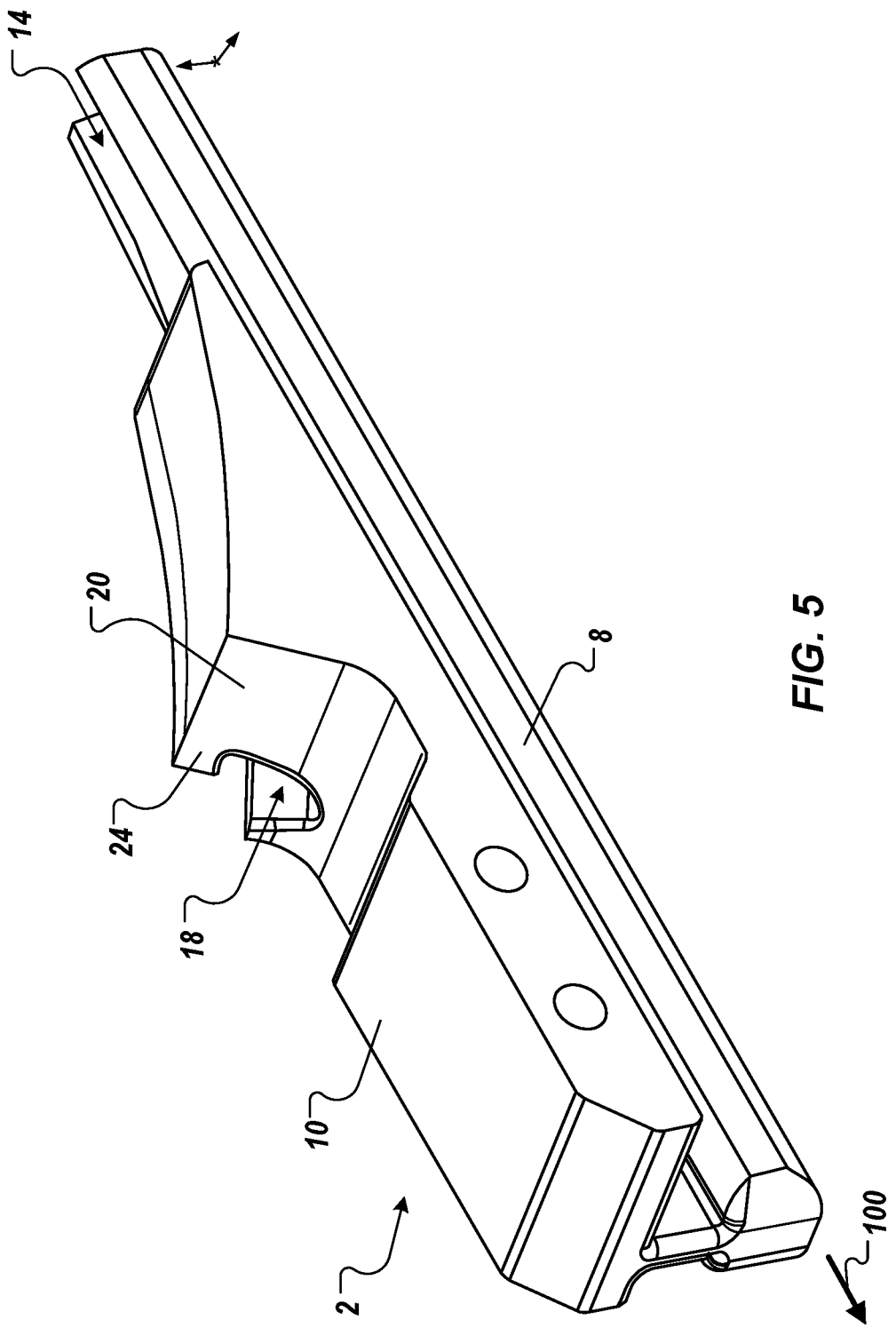
FIG. 5 is a third perspective view of the tool of FIG. 1.

FIG. 5 is a perspective view of tool 2 from another side of tool 2 than that shown in the views of FIGS. 3 and 4. In some implementations, as shown in FIG. 5, body 10 extends outward to one side of tool 2 to enable handle 6 to be attached off-center with respect to a center plane of strip 30, as described above. Alternatively, in some implementations body 10 is arranged to be substantially symmetric with respect to the center plane, such as in the two-side securing portion 20 configuration described above.

Figure 6:
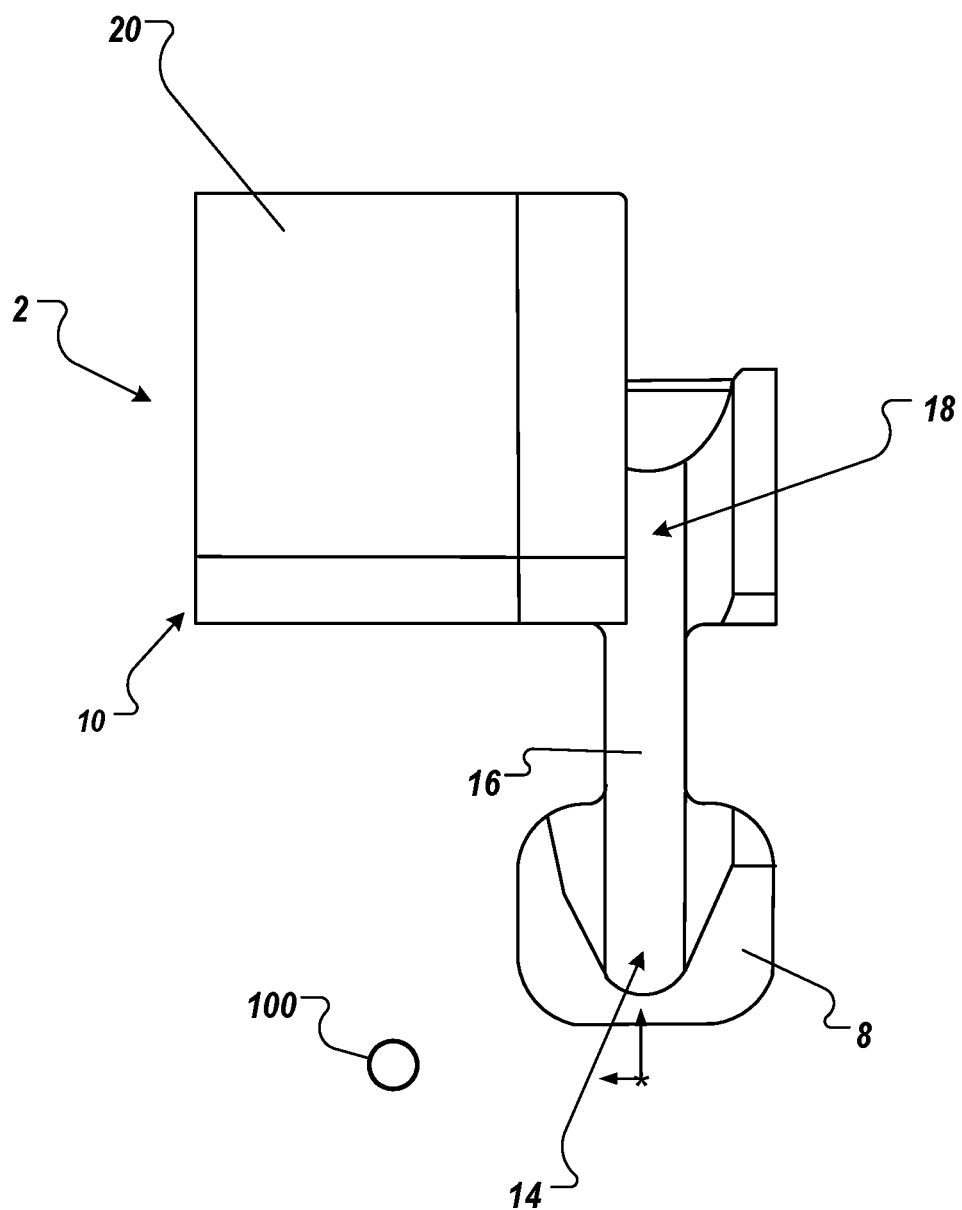
FIG. 6 is a back end view of the tool of FIG. 1.

FIG. 6 is a back end view of tool 2. In this view, the direction of movement 100 is directed into the page. The view of FIG. 6 shows the substantially continuous insertion path 16 that is configured to smoothly guide bead 50 into retention channel 36. As shown in FIG. 6, in some implementations, the sides of the back portion of head 8 have an angle such that the guiding recess continuation 14 is flared to have angled walls. This configuration provides for less friction between bead 50 and tool 2 as bead 50 is guided into strip 30.

Figure 7:
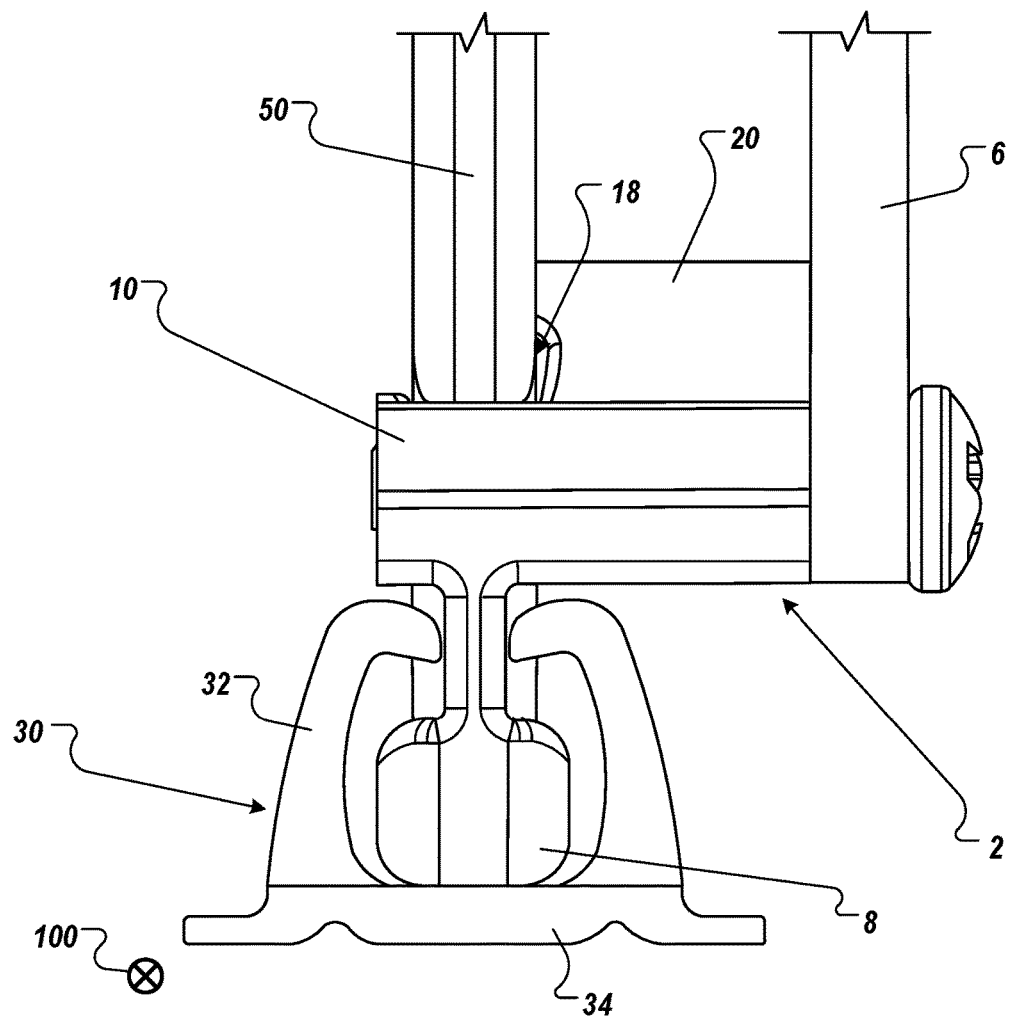
FIG. 7 is a front end view of the tool guiding the listing bead into the fastener strip, as shown in the perspective view of FIG. 1.

FIG. 7 is a front end view of tool 2 as it guides listing bead 50 into fastener strip 30. In the view of FIG. 7, the direction of movement 100 is out of the page. In some implementations, as shown in FIG. 7, the bottom of head 8 contacts base 34 of strip 30 as tool 2 is being moved. In some implementations, the top of head 8 may contact the bottom of the head(s) of elements 32, instead of or in addition to the bottom of head 8 contacting base 34. Accordingly, the height of head 8 may be equal to or less than the height of retention channel 36, that is the distance between base 34 and the bottom side of the head(s) of elements 32.

In cases where the bottom of head 8 contacts base 34, the installer may press tool 2 down onto strip 30 as tool 2 is being moved, to keep the bottom of head 8 in contact with base 34. In cases where the top of head 8 contacts the bottom of the head(s) of elements 32, strip 30 itself may effectively pull tool 2 into position and keep head 8 consistently situated in retention channel 36, relative to base 34, as tool 2 is moved. Accordingly, implementations where the top of head 8 contacts the bottom of the head(s) of elements 32 may enable tool 2 to be operated with less effort (e.g., less pressing) by the installer. In general, retention channel 36 guides tool 2 along strip 30 as tool 2 is moved. Strip 30 secures bead 50 in retention channel 36 after tool 2 has passed and elements 32 are allowed to return to their relaxed position, closing over the top of bead 50.

Figure 8:
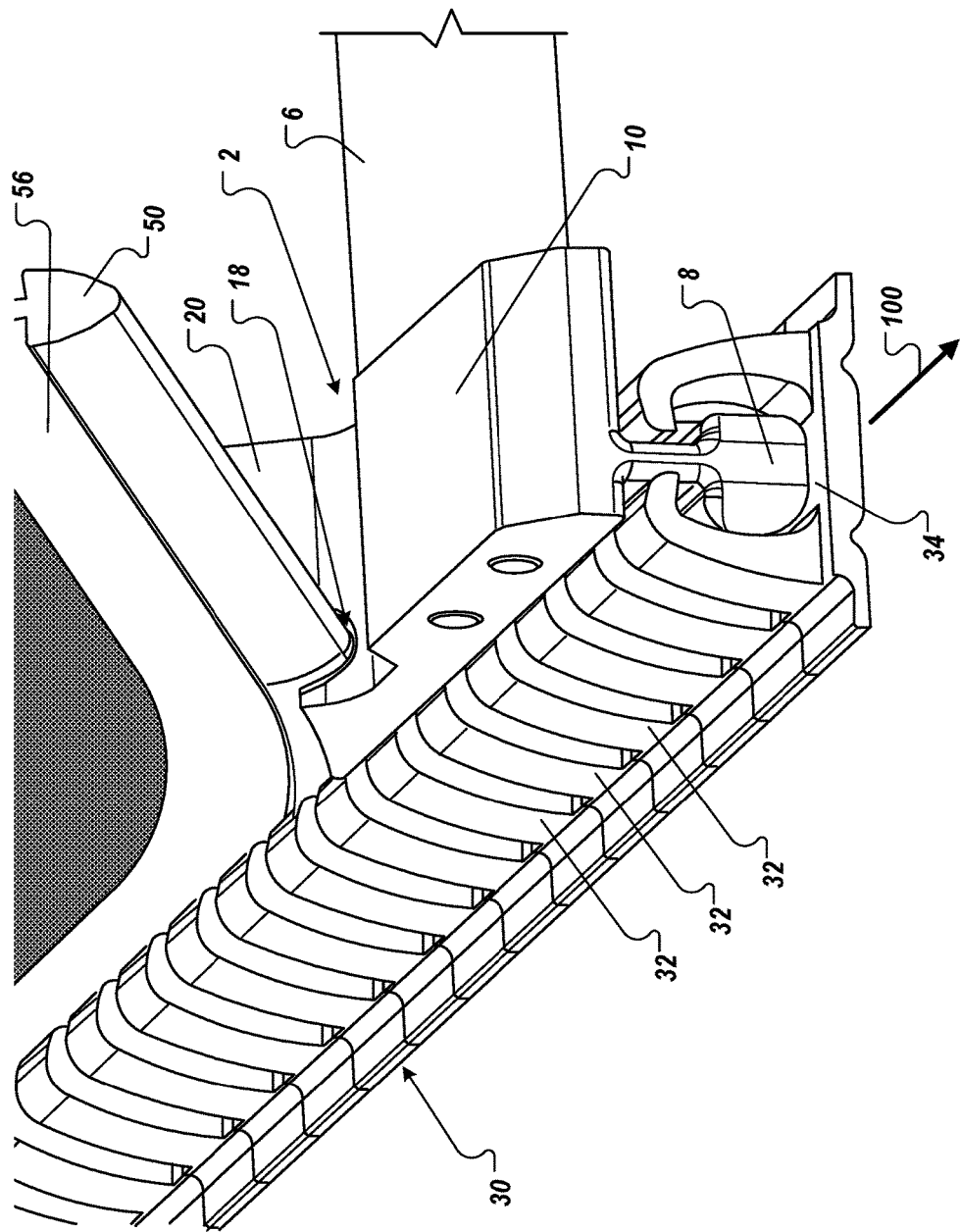
FIG. 8 is another perspective view of the tool guiding the listing bead into the fastener strip, as shown in the perspective view of FIG. 1.

Securing portion 20 contacts attachment portion 56 (not shown in FIG. 7) of bead 50 as bead 50 is being guided into strip 30 through movement of tool 2. The bottom of the bead 50 contacts the insertion path 16 and slides down the insertion path 16 as the bead 50 is guided into the strip 30 through movement of the tool 2. Because attachment portion 56 provides a smooth surface for securing portion 20 to slide along as tool 2 moves, this configuration reduces friction between bead 50 and tool 2 and prevents securing portion 20 from fraying the material of trim cover 52 as tool 2 moves. FIG. 8 provides another perspective view of tool 2 as it moves along direction 100 to guide listing bead 50 into fastener strip 30, as shown in the perspective view of FIG. 1.

Initially positioning tool 2 in strip 30, such that head 8 is in retention channel 36 before beginning to move tool 2, may be accomplished by aligning the front end of head 8 with the longitudinal axis of strip 30, inserting the front end of head 8 into retention channel 36, and sliding tool 2 until head 8 is fully inserted into retention channel 36. To facilitate this insertion, in some implementations the front end of head 8 may have a pointed shape, a wedge shape, and/or a taper to make it easier to insert head 8 into retention channel 36.

Alternatively, initially positioning tool 2 in strip 30, such that head 8 is in retention channel 36, may be accomplished by aligning the bottom of head 8 with the gap formed between the opposing heads of fastener elements 32. Tool 2 may then be pressed down onto strip 30 to force fastener elements 32 to separate and allow head 8 to enter retention channel 36. In some implementations, to facilitate this insertion, the bottom of head 8 may have a wedge shape to reduce the amount of force needed to separate opposing elements 32 and to snap tool 2 into strip 30.

After tool 2 is initially positioned in strip 30, the installer moves tool 2 along strip 30 to cause head 8 to pass through retention channel 36. Insertion path 16 may guide bead 50 downward through guiding recess 18 as tool 2 is moved, thus guiding bead 50 into retention channel 36. Elements 32 of strip 30 may then secure bead 50 in retention channel 36 as described above, by closing above bead 50 as tool 2 moves on, thus fastening bead 50 securely to strip 30.

In some examples, the length of tool 2 (e.g., the length of the head 8) is such that tool 2 spans between 3 and 5 of the fastener elements 32. Such a short length of tool 2 may enable tool 2 to more easily move around curves formed by strip 30 attached to the seat pad. Such a small tool 2 may, however, tend to break when under stress, depending on the particular material and configuration of tool 2. Accordingly, tool 2 may be longer, such that tool 2 spans between 10 and 12 of the fastener elements 32. Generally, tool 2 is preferably configured to be long enough such that it may not rotate easily with respect to an axis that is transverse to the longitudinal axis of strip 30 (directed upward from the base 34). For example, in some cases a tool 2 that spans 1 or 2 fastener elements 32 may not be sufficiently long to provide for stable movement of tool 2 through retention channel 36.

As described above, tool 2 may be configured to be wider in the front and/or middle portion of head 8 compared to the width of the back portion. With this configuration, head 8 may cause elements 32 to widen slightly and tool 2 may hold the opposing elements 32 displaced slightly apart, from their relaxed position, as bead 50 is guided into retention channel 36, thus facilitating the placement of bead 50 into retention channel 36. As tool 2 passes, elements 32 may return to their resting positions, thus closing around and securing bead 50 in strip 30.

Strip 30 and/or bead 50 may also include at least one holding feature on at least one of its ends, where such holding feature(s) are configured to hold the end of bead 50 in place against the end of strip 30 as bead 50 is being fastened to strip 30. This holding feature may be a narrowing of retention channel 36 at one end of strip 30. The holding feature may also be a thickening of bead 50 at one end, or an additional structure attached to the bead to prevent the end of the bead 50 from sliding into the retention channel 36 during the fastening process. The holding feature may extend beyond the end of the strip 30, and may have a width that is wider than the channel 36, to brace the bead 50 against the end of the strip 30. For implementations that lack such holding feature(s), the installer may hold onto trim cover 52 with one hand while guiding tool 2 with the other, at least until enough of strip 30 as engaged with bead 50 to securely hold bead 50 in place. The holding feature(s) of strip 30 and/or bead 50 may also enable trim cover 52 to be positioned more precisely relative to the seat pad.

In some cases, cover 52 and bead 50 may be delivered to the installer with tool 2 already attached to a holding feature that is attached to the bead 50. In such cases, tool 2 may initially break away from holding feature of the bead 50 and leave the holding feature in place at the end of bead 50. For example, the tool 2 may be crimped to the holding feature of the bead 50 during manufacture of the tool 2 and bead 50, and the installer may break the crimp at the start of installation (e.g., by pressing down slightly on the tool) to leave the holding feature at the end of the bead 50, to hold the end of the bead 50 at the end of the strip 30. In implementations where tool 2 is delivered already attached to bead 50, tool 2 may be made smaller and with fewer features, e.g., without the features that facilitate initially threading tool 2 onto bead 50. Thus, in such implementations, tool 2 may be less expensive to manufacture. Following installation, the tool 2 may be disposed of or returned to the manufacturer for re-use.

The tool described herein provides various technical improvements and/or advantages over traditional fastening techniques. As described above, head 8 of tool 2 is configured to move internally through retention channel 36 defined by elements 32, instead of a tool that engages externally such as in traditional techniques. By moving through retention channel 36, tool 2 is stabilized by elements 32 and base 34 and therefore less likely to be inadvertently disengaged from strip 30 during movement, as may occur with traditional tools that engage externally. Moreover, tool 2 described herein enables the fastening of two different types of structures one to another, i.e., the fastening of bead 50 to strip 30, instead of fastening opposing types of the same element as in traditional techniques. Thus, implementations provide a more flexible fastening mechanism than traditional techniques by allowing some variation in the particular structures of bead 50 and strip 30.

A number of implementations have been described. Nevertheless, it will be understood that various modifications may be made without departing from the spirit and scope of the invention. Accordingly, other implementations are within the scope of the following claims.

What is claimed is:

1. A method of fastening a listing bead to a fastener strip, the method comprising:
grasping a tool having a body and a guide rib extending from the body, the guide rib having a neck and a head connected to the body by the neck, the body defining a guiding recess shaped to receive the listing bead;
inserting the head of the guide rib into a retention channel defined between opposing rows of fastener elements extending from a base of the fastener strip, with the guiding recess defining a listing bead insertion path angled with respect to the retention channel; and
moving the tool along the retention channel, thereby causing the listing bead retained within the guiding recess to be progressively inserted into the retention channel and retained between the rows of fastener elements.

2. The method of claim 1, further comprising:
prior to moving the tool along the retention channel, inserting the listing bead into the guiding recess.

3. The method of claim 1, wherein inserting the head includes inserting the head into an end of the retention channel.

4. The method of claim 3, wherein a leading portion of the head is tapered to facilitate inserting the head into the end of the retention channel.

5. The method of claim 1, wherein inserting the head includes pressing on the tool to insert the head between the opposing rows of fastener elements.

6. The method of claim 5, wherein a bottom portion of the head is configured as a wedge, along a length of the head, that facilitates inserting the head into the retention channel.

7. The method of claim 1, wherein the head is configured to displace the fastener elements and widen the retention channel as the listing bead is guided into the retention channel.

8. The method of claim 7, wherein the head is further configured to allow the fastener elements to relax and at least partly enclose the listing bead and retain the listing bead in the strip as the tool moves along the fastener strip.

9. The method of claim 1, wherein:
the tool is initially attached to a holding feature at an end of the listing bead; and
the method further comprises detaching the tool from the holding feature prior to moving the tool along the retention channel.

10. The method of claim 9, wherein the holding feature, after being detached from the tool, holds the end of the listing bead against a corresponding end of the fastener strip while the listing bead is progressively inserted into the retention channel.

11. The method of claim 1, wherein:
at least some of the fastener elements include, at a distal end of the respective fasteners, a head portion that extends over the base of the fastener strip; and
the head of the guide rib has a top that contacts a bottom of the respective head portions of at least some of the fastener elements while the head is in the retention channel.

12. The method of claim 11, wherein the fastener elements of only one of the opposing rows of fastener elements includes the head portions that extend over the base of the fastener strip.

* * * * *

UNITED STATES PATENT AND TRADEMARK OFFICE
CERTIFICATE OF CORRECTION

PATENT NO. : 10,336,226 B2
APPLICATION NO. : 15/440230
DATED : July 2, 2019
INVENTOR(S) : Paul Joseph Voigt, Victor Horst Kheil and Michael Cina Page 1 of 1

It is certified that error appears in the above-identified patent and that said Letters Patent is hereby corrected as shown below:

On the Title Page

Column 1, (71) Applicant: delete "Beinze" and insert --Deinze--.

Signed and Sealed this
Third Day of September, 2019

Andrei Iancu
*Director of the United States Patent and Trademark Office*